(12) United States Patent
Motooka

(10) Patent No.: US 12,186,896 B2
(45) Date of Patent: Jan. 7, 2025

(54) ROBOT

(71) Applicant: FANUC CORPORATION, Yamanashi (JP)

(72) Inventor: Ayumu Motooka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/252,233

(22) PCT Filed: Dec. 16, 2021

(86) PCT No.: PCT/JP2021/046520
§ 371 (c)(1),
(2) Date: May 9, 2023

(87) PCT Pub. No.: WO2022/138445
PCT Pub. Date: Jun. 30, 2022

(65) Prior Publication Data
US 2024/0009868 A1    Jan. 11, 2024

(30) Foreign Application Priority Data

Dec. 21, 2020   (JP) .................................. 2020-211002

(51) Int. Cl.
*B25J 9/12*        (2006.01)
*B25J 19/00*       (2006.01)
(Continued)

(52) U.S. Cl.
CPC ......... *B25J 19/0045* (2013.01); *B25J 19/005* (2013.01); *H02J 7/0068* (2013.01); *H02J 50/00* (2016.02)

(58) Field of Classification Search
CPC ............... B25J 19/00; H02J 50/00; H02J 7/00
See application file for complete search history.

(56) References Cited

U.S. PATENT DOCUMENTS

| | | | |
|---|---|---|---|
| 2019/0027974 A1* | 1/2019 | Kanno | H02J 50/70 |
| 2020/0198127 A1* | 6/2020 | Motonaga | H02J 50/10 |
| 2024/0041541 A1* | 2/2024 | Steer | A61B 90/98 |

FOREIGN PATENT DOCUMENTS

| | | |
|---|---|---|
| JP | H09-300270 A | 11/1997 |
| JP | 2004-265894 A | 9/2004 |
| JP | 2018-094650 A | 6/2018 |

OTHER PUBLICATIONS

"Employed in SCARA robot! Solution to disconnection in rotating handling part of robot!, Product brochure of RS12-422N ASET", B & PLUSKK, Japan, Retrieved from the Internet on Nov. 30, 2020, URL: https://www.b-plus-kk.jp/blog/2017/.

* cited by examiner

Primary Examiner — Jared Fureman
Assistant Examiner — Esayas G Yeshaw
(74) Attorney, Agent, or Firm — Maier & Maier, PLLC

(57) ABSTRACT

A robot includes: an arm; a shaft supported at a tip of the arm so as to be movable in a direction of a predetermined axis; a power transmitting unit fixed to the arm and connected to a power supply; and a power receiving unit and a battery that are fixed to the shaft. In a state in which the shaft is positioned at a predetermined position in the direction of the axis, the power receiving unit is close to the power transmitting unit to wirelessly receive power transmitted from the power transmitting unit, and the battery stores the power received by the power receiving unit and uses the power as a power source of a device attached to the shaft.

5 Claims, 5 Drawing Sheets

(51) Int. Cl.
*H02J 7/00* (2006.01)
*H02J 50/00* (2016.01)

ROBOT

TECHNICAL FIELD

The present disclosure relates to a robot.

BACKGROUND

A known SCARA robot includes a shaft supported so as to be movable in the vertical direction with respect to an arm, and a power supply device that supplies, in a non-contact manner, power to a tool attached to the lower end of the shaft (for example, see Employed in SCARA robot! Solution to disconnection in rotating handling part of robot!", [online], [searched on Nov. 30, 2020], Internet <URL: https://www.b-plus-kk.jp/blog/2017/11/13/254). In this SCARA robot, the power supply device is attached to the upper end of the shaft, and, when the shaft is moved up or down with respect to the arm, the entire power supply device is moved up or down together with the shaft.

SUMMARY

An aspect of the present disclosure is a robot including: an arm; a shaft supported at a tip of the arm so as to be movable in a direction of a predetermined axis; a power transmitting unit fixed to the arm and connected to a power supply; and a power receiving unit and a battery that are fixed to the shaft. In a state in which the shaft is positioned at a predetermined position in the direction of the axis, the power receiving unit is brought close to the power transmitting unit to wirelessly receive power transmitted from the power transmitting unit, and the battery stores the power received by the power receiving unit and uses the power as a power source of a device attached to the shaft.

DETAILED DESCRIPTION OF EMBODIMENTS

A robot 1 according to an embodiment of the present disclosure will be described below with reference to the drawings.

Figure 1:
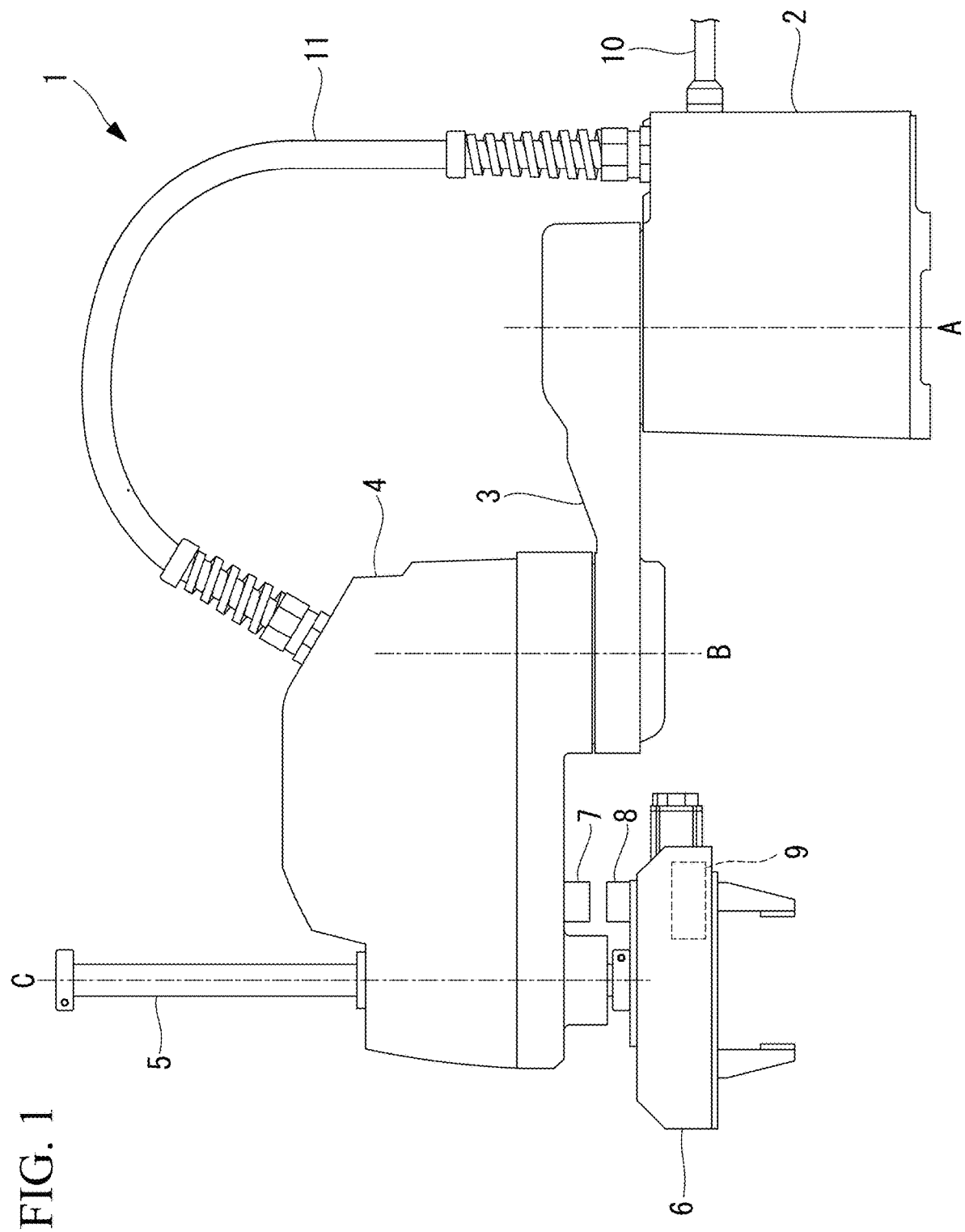
FIG. 1 shows an overall configuration of a robot according to an embodiment of the present disclosure.

The robot 1 according to this embodiment is, for example, a horizontal articulated type robot as illustrated in FIG. 1. The robot 1 includes a base 2 installed on a horizontal floor surface, and a first arm 3 supported so as to be rotatable about a first axis (first vertical axis) A extending in the vertical direction with respect to the base 2. The robot 1 includes a second arm (arm) 4 supported so as to be rotatable about a second axis (second vertical axis) B, which is parallel to the first axis A, with respect to the first arm 3, and a shaft 5 supported by the second arm 4 so as to be able to move up and down along a third axis (axis) C, which is parallel to the first axis A.

The robot 1 also includes a power transmitting unit 7 attached to the second arm 4, and a power receiving unit 8 and a battery 9 fixed to a tool (device) 6 attached to a tip of the shaft 5. By being fixed to the tool 6, the power receiving unit 8 and the battery 9 are indirectly fixed to the shaft 5 via the tool 6.

Figure 2:
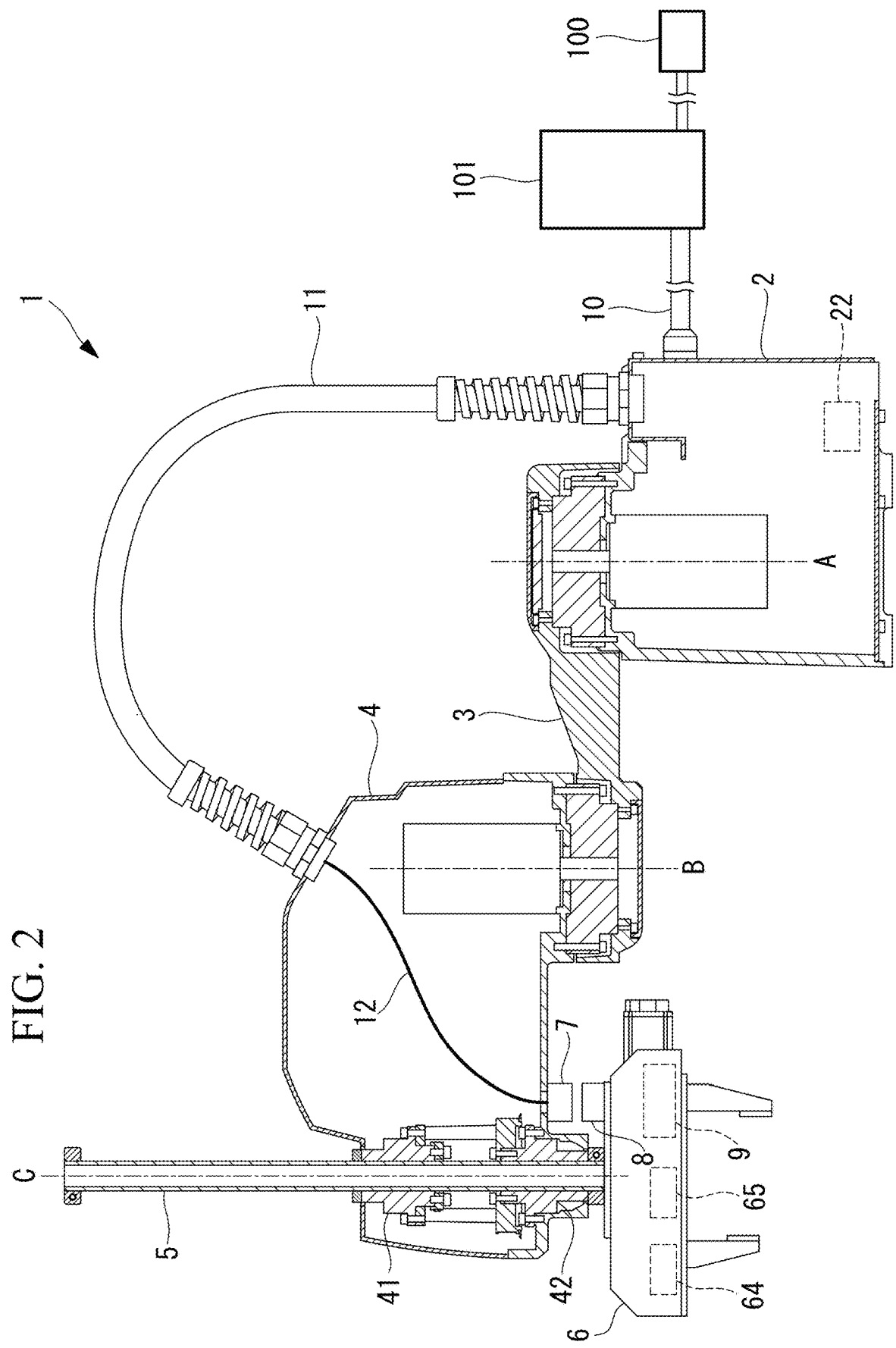
FIG. 2 is a cross-section showing an internal structure of the robot in FIG. 1.

As shown in FIG. 2, the robot 1 is connected to a controller 101 by a cable 10 connected to the base 2, and the controller 101 is connected to a power supply 100. A duct 11 is connected between the base 2 and the second arm 4, and cables 12 wired from the base 2 to the second arm 4 are accommodated in the duct 11.

FIG. 2 illustrates only the cable 12 connected to the power transmitting unit 7 (described below). The cable 10 and the cables 12 transmit power, control signals, and the like from the controller 101.

The base 2 is provided with a first transmitter/receiver 22 for transmitting and receiving control signals by wireless communication. The first transmitter/receiver 22 may be disposed in the controller 101 or may be disposed at another position, such as the second arm 4.

The shaft 5 is a ball-screw spline shaft passing through a tip portion of the second arm 4 in the vertical direction. The shaft 5 is supported by a ball screw nut 41 disposed in the second arm 4 so as to be able to move up and down along the third axis C, and is also supported by a ball spline nut 42 disposed in the second arm 4 so as to be rotatable about the third axis C. The ball screw nut 41 and the ball spline nut 42 are supported so as to be rotatable about the third axis C and are each rotationally driven by a motor (not shown).

Figure 3:
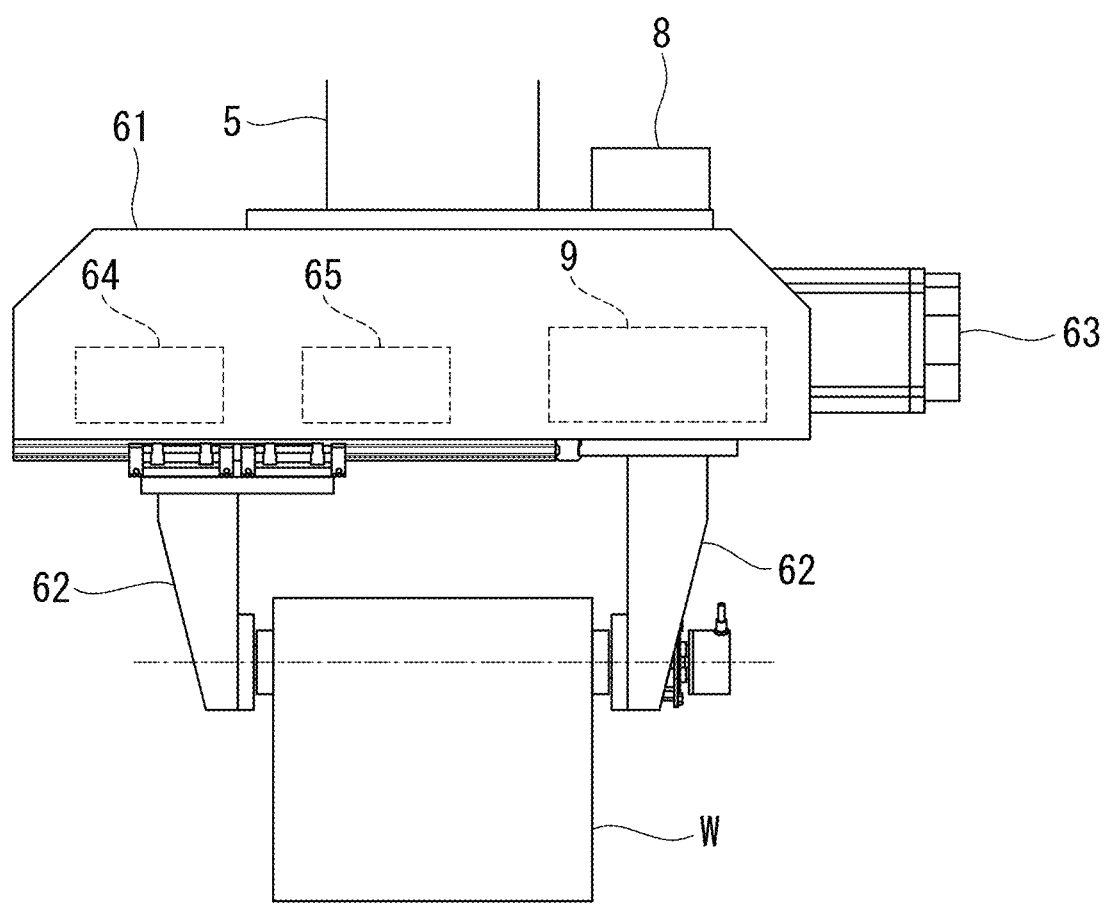
FIG. 3 is an enlarged view of a tool attached to the robot in FIG. 1.
Figure 5:
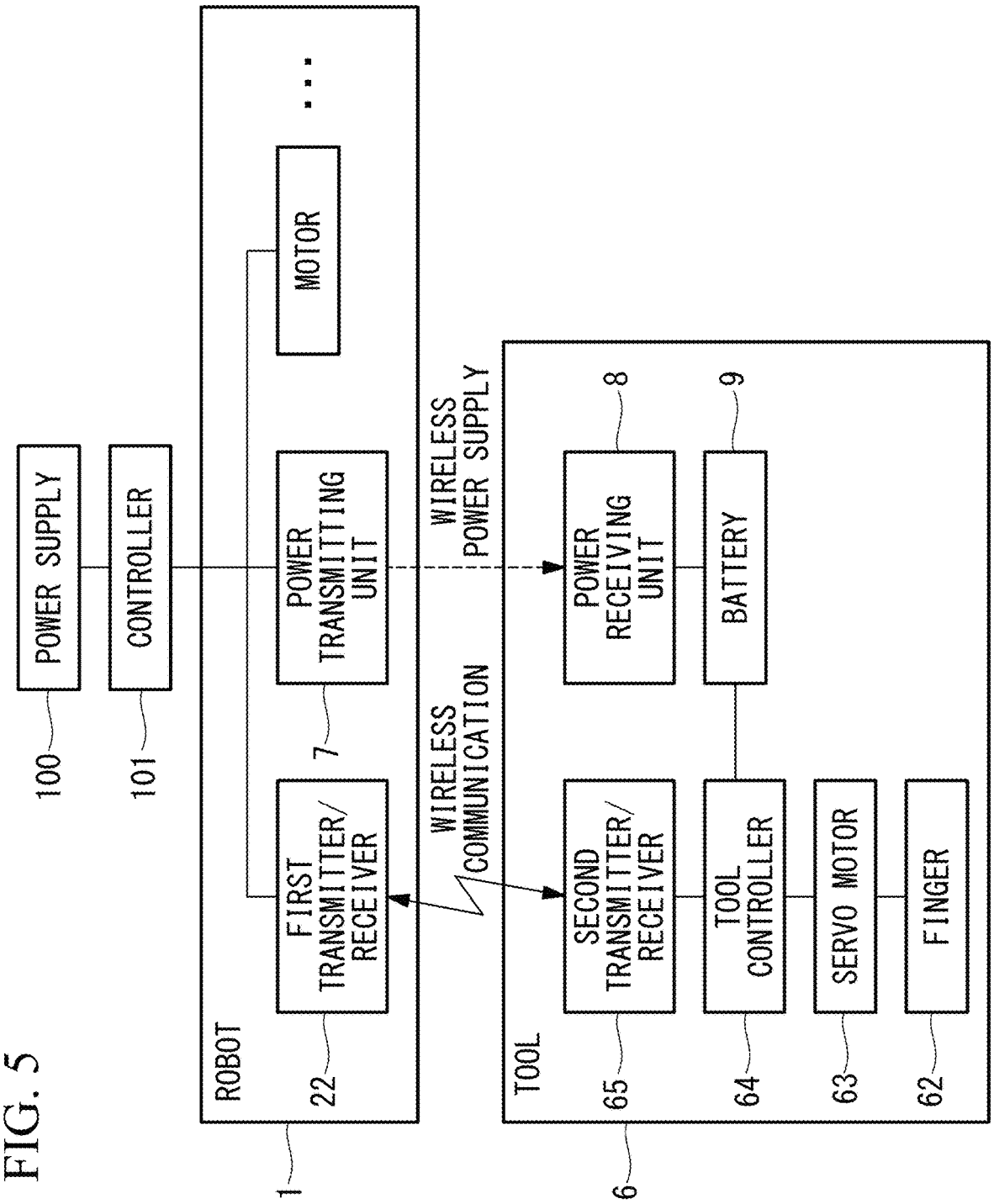
FIG. 5 is a block diagram of the robot and the tool in FIG. 1.

As shown in, for example, FIG. 3, the tool 6 is a hand that performs work, such as gripping a workpiece W. The tool 6 includes a hand base 61 fixed to the lower end of the shaft 5, a pair of fingers 62 supported by the hand base 61, and a servo motor 63 that drives the fingers 62 to open and close. As shown in FIGS. 2 and 5, the tool 6 is provided with a tool controller 64 for controlling the tool 6, and a second transmitter/receiver 65 for wirelessly transmitting/receiving control signals to/from the first transmitter/receiver 22.

The battery 9 is connected to the power receiving unit 8 and the tool controller 64.

The power transmitting unit 7 is fixed to the lower surface of the second arm 4, and the cable 12 introduced into the second arm 4 through the duct 11 is connected to the power transmitting unit 7.

The power receiving unit 8 is fixed to the upper surface of the hand base 61. As shown in FIG. 2, in a state in which the shaft 5 is positioned at the uppermost position in the motion range in the vertical direction and is positioned at a predetermined angle about the third axis C (charging position), the power receiving unit 8 is disposed at a position facing the power transmitting unit 7 with a predetermined gap therebetween in the vertical direction.

In a state in which the power transmitting unit 7 and the power receiving unit 8 face each other, the power transmitted through the cable 12 is transmitted from the power transmitting unit 7 to the power receiving unit 8 in a non-contact manner, and the battery 9 is charged with the power. The tool controller 64 controls the servomotor 63 in accordance with the control signals wirelessly transmitted from the first transmitter/receiver 22 to operate the tool 6.

The operation of the thus-configured robot 1 according to this embodiment will be described.

In order to perform work with the tool 6 by using the robot 1 according to this embodiment, the shaft 5 is operated to position the tool 6 at a charging position with respect to the second arm 4, as illustrated in FIG. 2, so that the power receiving unit 8 faces the power transmitting unit 7. In this state, power is transmitted from the power transmitting unit 7 to the power receiving unit 8 in a non-contact manner, and the battery 9 is charged with the power received by the power receiving unit 8.

By operating the ball screw nut 41 and the ball spline nut 42 in a state in which the battery 9 has been appropriately charged, the shaft 5 is moved up or down and rotated about the third axis C to position the tool 6 at a desired position.

Figure 4:
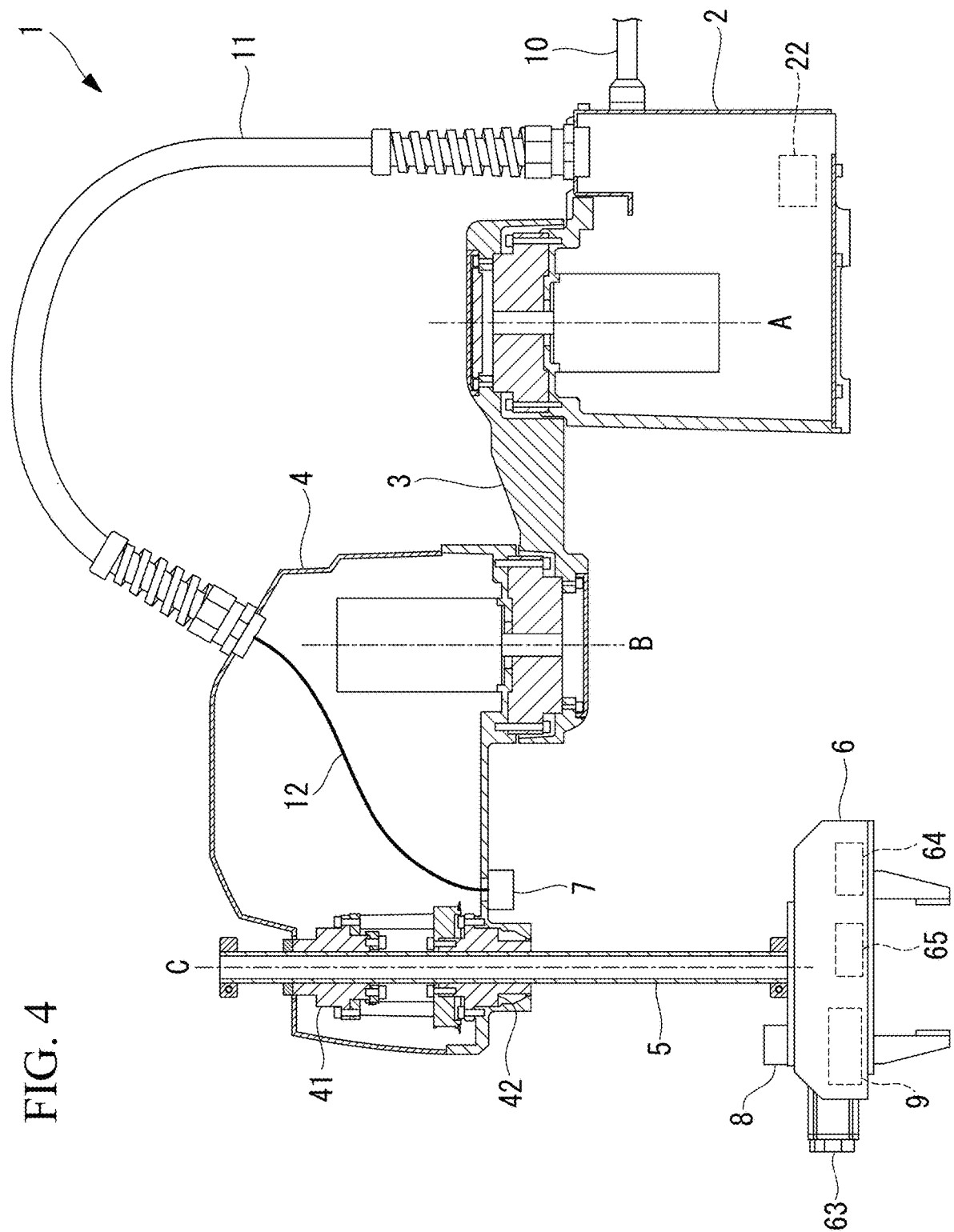
FIG. 4 is a cross-section of the robot in FIG. 1 when the shaft is disposed at a position different from the position in FIG. 2.

For example, as shown in FIG. 4, in a state in which the power transmitting unit 7 and the power receiving unit 8 are away from each other, the supply of power from the power transmitting unit 7 is stopped. Hence, the tool 6 is controlled by the tool controller 64 provided in the tool 6 with the power charged in the battery 9.

Specifically, as shown in FIG. 5, the second transmitter/receiver 65 receives a control signal wirelessly transmitted from the first transmitter/receiver 22. The tool controller 64 is supplied with power from the battery 9 and receives a control signal from the second transmitter/receiver 65. Then, the tool controller 64 supplies power to the servo motor 63 on the basis of the input control signal.

This way, the robot 1 can drive the tool 6 disposed at a position other than the charging position and perform a desired operation.

In this case, in the robot 1 according to this embodiment, the second arm 4 and the shaft 5 are not connected by a movable cable. Hence, the shaft 5 can perform up/down operations and rotating operations about the third axis C with respect to the second arm 4 without being restricted by the movable cable. Hence, it is possible to ensure a wide motion range for the shaft 5.

In addition, because the power transmitting unit 7 is fixed to the second arm 4, even when the shaft 5 is displaced with respect to the second arm 4, the cable 12 connected to the power transmitting unit 7 can be maintained in a stationary state in the second arm 4. Therefore, it is possible to prevent the cable 12 from being repeatedly deformed with the movement of the shaft 5 and to improve the durability of the robot 1.

In addition, in the robot 1 according to this embodiment, it is only necessary to operate the shaft 5 with respect to the second arm 4 in order to charge the battery 9 provided in the tool 6. Specifically, because there is no need to operate the first arm 3 and the second arm 4 for charging, the moving distance of the tool 6 for charging can be minimized. This can minimize the time required for the operation for charging, and can also reduce the possibility of interference between the tool 6 and a peripheral object due to the operation for charging.

By minimizing the time required for the operation for charging, not only can charging be performed in the waiting time between operations by the tool 6, but also charging can be performed during the operation by frequently moving the tool 6 to the charging position. This leads to an advantages that the capacity of the battery 9 can be reduced and the weight thereof can be reduced.

Although the power transmitting unit 7 is fixed to the second arm 4 in this embodiment, the power transmitting unit 7 may be removably attached to the second arm 4 instead.

For example, the lower surface of the second arm 4 may be provided with a screw hole (attaching portion) to which a bolt for removably attaching the power transmitting unit 7 will be fastened. With this configuration, if a failure or the like occurs in the power transmitting unit 7, it is possible to remove only the power transmitting unit 7 from the second arm 4 for maintenance and thus to improve maintainability.

Furthermore, by providing screw holes for attaching the power transmitting unit 7 at multiple positions, the power transmitting unit 7 can be attached at an appropriate position in accordance with the position of the power receiving unit 8 disposed on the tool 6.

Although one power transmitting unit 7 and one power receiving unit 8 are provided in this embodiment, instead, at least one of the power transmitting unit 7 and the power receiving unit 8 may be provided in multiple numbers.

With such a configuration, multiple charging positions, where the tool 6 is disposed when the battery 9 is charged, can be set. Hence, it is possible to select a charging position that requires the minimum moving distance of the shaft 5 depending on the position of the shaft 5 immediately before charging the battery 9 and thus to further improve the efficiency of the charging operation.

Although the power receiving unit 8 and the battery 9 are provided on the tool 6 in this embodiment, they may be fixed to the shaft 5 separately from the tool 6.

Furthermore, in this embodiment, the power transmitting unit 7 is fixed to the lower surface of the second arm 4, and the power receiving unit 8 is fixed to the upper surface of the tool 6, so that the power transmitting unit 7 and the power receiving unit 8 face each other in the vertical direction at the charging position. Instead of this, the power transmitting unit 7 may be fixed to the upper surface of the second arm 4, and the power receiving unit 8 may be made to face the upper part of the power transmitting unit 7 at the charging position. Alternatively, the power transmitting unit 7 and the power receiving unit 8 may be disposed at positions facing each other in the radial direction around the third axis C at the charging position.

This configuration allows the power transmitting unit 7 and the power receiving unit 8 to be disposed at positions unlikely to interfere with peripheral devices.

In this embodiment, the battery 9 may be charged during the movement of the first arm 3 and the second arm 4.

For example, the tool 6 may be disposed at a predetermined charging position with respect to the second arm 4 whose posture is being drastically changed while the first arm 3 and the second arm 4 are rotated about the first axis A and the second axis B, respectively, in order to switch from the current step to the next step.

By doing so, it is possible to charge the battery 9 while effectively using time required for switching steps and thus to improve the work efficiency of the robot 1.

Although an example of the robot 1 is a horizontal articulated type robot in this embodiment, the robot 1 is not limited thereto, and it may be applied to any type of robot that supports the tool 6 so as to be movable in a predetermined axial direction.

Furthermore, although an example of the tool 6 is a hand in this embodiment, the tool 6 is not limited thereto and may be any tool such as a machining tool, a coating tool, or a cleaning tool.

Furthermore, although an example of an electric actuator of the tool 6 is the servomotor 63 in this embodiment, the electric actuator is not limited thereto and may be any actuator, such as an electromagnetic valve or an electromagnet, that is driven by electricity.

The invention claimed is:
1. A robot comprising:
an arm;

a shaft supported by the arm so as to be movable with respect to the arm in a direction of a predetermined axis;

a power transmitting unit fixed to the arm and connected to a power supply; and a power receiving unit and a battery that are disposed at positions fixed to the shaft, wherein the power receiving unit wirelessly receives power transmitted from the power transmitting unit when the shaft is moved in the direction of the predetermined axis so that the power receiving unit faces the power transmitting unit, and the battery stores the power received by the power receiving unit and uses the power as a power source of a device attached to the shaft.

2. The robot according to claim 1, further comprising a first arm that is supported so as to be rotatable about a first vertical axis, wherein the arm is supported at a tip of the first arm so as to be rotatable about a second vertical axis, which is parallel to the first vertical axis.

3. The robot according to claim 1, wherein the shaft is supported by the arm so as to be further rotatable about the predetermined axis, and the power receiving unit wirelessly receives the power transmitted from the power transmitting unit when the shaft is moved in the direction of the predetermined axis and is rotated about the predetermined axis so that the power receiving unit faces the power transmitting unit.

4. The robot according to claim 1, wherein a plurality of attachment portions for removably attaching the power transmitting unit are provided in an outer surface of the arm.

5. The robot according to claim 1, wherein at least one of the power transmitting unit and the power receiving unit is provided in multiple numbers.

* * * * *